(12) United States Patent
Duque Biarge et al.

(10) Patent No.: US 11,047,977 B2
(45) Date of Patent: Jun. 29, 2021

(54) VEHICLE RADAR SYSTEM WITH SOLUTION FOR ADC SATURATION

(71) Applicant: Magna Electronics Inc., Auburn Hills, MI (US)

(72) Inventors: Sergio Duque Biarge, Munich (DE); Luca Marotti, Munich (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 323 days.

(21) Appl. No.: 16/280,380

(22) Filed: Feb. 20, 2019

(65) Prior Publication Data

US 2019/0257941 A1 Aug. 22, 2019

Related U.S. Application Data

(60) Provisional application No. 62/632,704, filed on Feb. 20, 2018.

(51) Int. Cl.
| | | |
|---|---|---|
| *G01S 13/32* | (2006.01) | |
| *G01S 13/931* | (2020.01) | |
| *G01S 13/86* | (2006.01) | |
| *G01S 13/34* | (2006.01) | |
| *G01S 7/03* | (2006.01) | |
| *G01S 7/40* | (2006.01) | |

(52) U.S. Cl.
CPC .......... *G01S 13/931* (2013.01); *G01S 7/032* (2013.01); *G01S 7/4021* (2013.01); *G01S 13/325* (2013.01); *G01S 13/346* (2013.01); *G01S 13/867* (2013.01); *G01S 2013/93271* (2020.01)

(58) Field of Classification Search
CPC .... G01S 13/325; G01S 13/867; G01S 13/931; G01S 13/346; G01S 2013/93271; G01S 2013/9375; G01S 7/032; G01S 7/4021
See application file for complete search history.

(56) References Cited

U.S. PATENT DOCUMENTS

| | | | | |
|---|---|---|---|---|
| 4,792,787 A | * | 12/1988 | Speiser | ................. H03M 1/208 341/156 |
| 6,587,186 B2 | | 7/2003 | Bamji et al. | |
| 6,674,895 B2 | | 1/2004 | Rafii et al. | |
| 6,678,039 B2 | | 1/2004 | Charbon | |
| 6,690,268 B2 | | 2/2004 | Schofield et al. | |
| 6,690,354 B2 | | 2/2004 | Sze | |

(Continued)

FOREIGN PATENT DOCUMENTS

WO 2011090484 A1 7/2011

*Primary Examiner* — Timothy A Brainard
(74) *Attorney, Agent, or Firm* — Honigman LLP

(57) ABSTRACT

A vehicular sensing system includes a radar sensor having a field of sensing exterior of the vehicle, a plurality of transmitters that transmit radio signals, a plurality of receivers that receive radio signals. The radar sensor includes a first ADC, a second ADC, a DAC and a subtractor. The first ADC converts an analog input signal derived from the received radio signals into a first number of bits. The DAC converts the first number of bits into a first analog signal. The subtractor subtracts the first analog signal from the input signal to determine a second analog signal. The second ADC converts the second analog signal into a second number of bits. The first and second numbers of bits are appended to establish a total number of bits that represent a digital value of the voltage of the analog input signal.

20 Claims, 2 Drawing Sheets

(56) References Cited

U.S. PATENT DOCUMENTS

| | | |
|---|---|---|
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B1 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 2010/0245066 A1 | 9/2010 | Sarioglu et al. |
| 2012/0062743 A1 | 3/2012 | Lynam et al. |
| 2012/0218412 A1 | 8/2012 | Dellantoni et al. |
| 2013/0120761 A1* | 5/2013 | Dyer .............. G01S 7/4912 356/614 |
| 2013/0222592 A1 | 8/2013 | Gieseke |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0210853 A1 | 7/2016 | Koravadi |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2019/0339382 A1 | 11/2019 | Hess et al. |

* cited by examiner

VEHICLE RADAR SYSTEM WITH SOLUTION FOR ADC SATURATION

CROSS REFERENCE TO RELATED APPLICATION

The present application claims the filing benefits of U.S. provisional application Ser. No. 62/632,704, filed Feb. 20, 2018, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of imaging and radar sensors in vehicle imaging systems is common and known. Examples of such known systems are described in U.S. Pat. No. 8,013,780, which is hereby incorporated herein by reference in its entirety.

SUMMARY OF THE INVENTION

The present invention provides a driving assistance system or sensing system or control system for a vehicle that utilizes one or more radar sensors to sense regions exterior of the vehicle, with the radar sensor that transmits and receives signals, with the received signals processed to detect the presence of objects at or near the vehicle in the field of sensing of the sensor. The system includes a processor operable to process outputs of the receivers. The radar sensor also includes a first analog-to-digital converter (ADC), a second ADC, a digital-to-analog converter (DAC), and a subtractor. The first ADC has a different dynamic range than the second ADC. The first ADC converts an input signal into a first number of bits. The DAC converts the first number of bits into a first analog signal. The subtractor subtracts the first analog signal from the input signal to determine a second analog signal. The second ADC converts the second analog signal into a second number of bits. The first number of bits and the second number of bits are appended to determine a total bits (with the total number of bits determining the resolution of the radar sensor).

These and other objects, advantages, purposes and features of the present invention will become apparent upon review of the following specification in conjunction with the drawings.

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
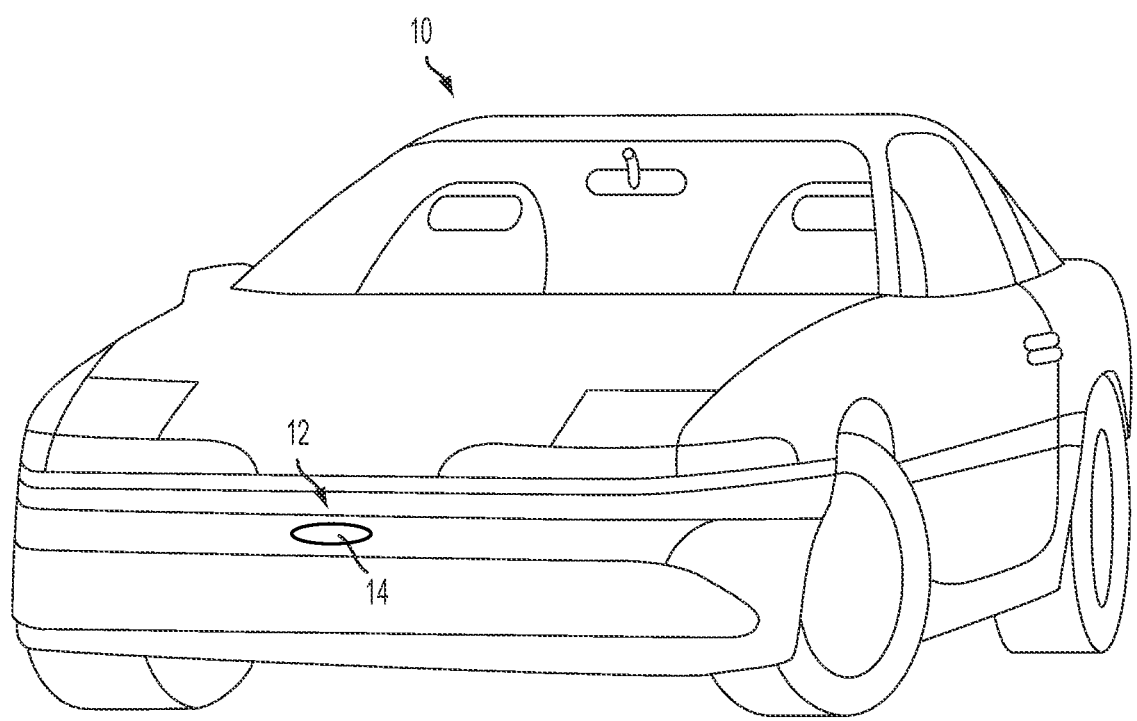
FIG. 1 is a plan view of a vehicle with a vision system that incorporates cameras in accordance with the present invention.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The sensing system may also include a radar sensor that includes plurality of transmitters that transmit radio signals via plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The data transfer or signal communication from the sensor to the ECU may comprise any suitable data or communication link, such as a vehicle network bus or the like of the equipped vehicle.

Automotive code radars (also called phase modulation or pseudo random noise radars) commonly suffer from analog-to-digital converter (ADC) saturation. These types of radars (based on phase modulation) need to cover all the power dynamic range at the ADC input. The size of the dynamic range is provided primarily by two factors. The first factor is the distance covered by the radar. The second factor is target reflectivity dynamic range of the detected targets. The desired distance covered by automotive radars may be close to 250 meters (or more). At the same time, the detected targets detected commonly have a large Radar Cross Section (RCS) dynamic range. For example, at 77 GHz, a large vehicle trailer can have a RCS of 30 dBsm while a child can be around −14 dBsm. Thus, the power dynamic range just due to RCS can be above 40 dBs.

An alternative to covering the dynamic range with low resolution ADCs is to provide a pulse mode. In this way, the targets in very near range with a powerful backscattering signal can be omitted. The same happens with the antenna leakage between transmitters and receivers, which is in most cases the main contributor to saturation. However, in a pulse mode, the power received from targets through time is significantly less than in continuous wave mode. This implies a worsened signal to noise ratio with consequences such as miss detection, low accuracies and low performance of the following post-processing modules.

The recommended number of resolution bits for Highly Automated Driving (HAD) for modulations that need all the dynamic power range at ADC input, such as Code and orthogonal frequency-division multiplexing (OFDM) Radars, is a large number of bits (preferably 10 bits or more, such as, for example, 14 bits). Automotive ADCs are required to be fast, have a high sampling rate, and be low cost. Typically, ADC price increases significantly with the number of bits. The present invention provides a combination of two low resolution ADCs (for example, each ADC may comprise a 5 bit ADC or a 7 bit ADC, or lower) in order to keep costs low and to provide configuration suitable for modulations such as OFDM and Code Radars.

In accordance with the present invention, two low resolution ADCs are combined for an automotive Radar in order to provide similar capabilities of an ADC with much finer resolution. In this way, there is no saturation and no loss of fine detail without the need of high cost ADC. The two ADCs are set with different dynamic ranges. The dynamic range of an ADC indicates the range of signal amplitudes which the ADC can resolve (i.e., the ratio between the largest and smallest values that the ADC can reliably measure). The first ADC gets a coarser value of the backscattered signal while the second ADC provides finer steps (see FIG. 2).

Figure 2:
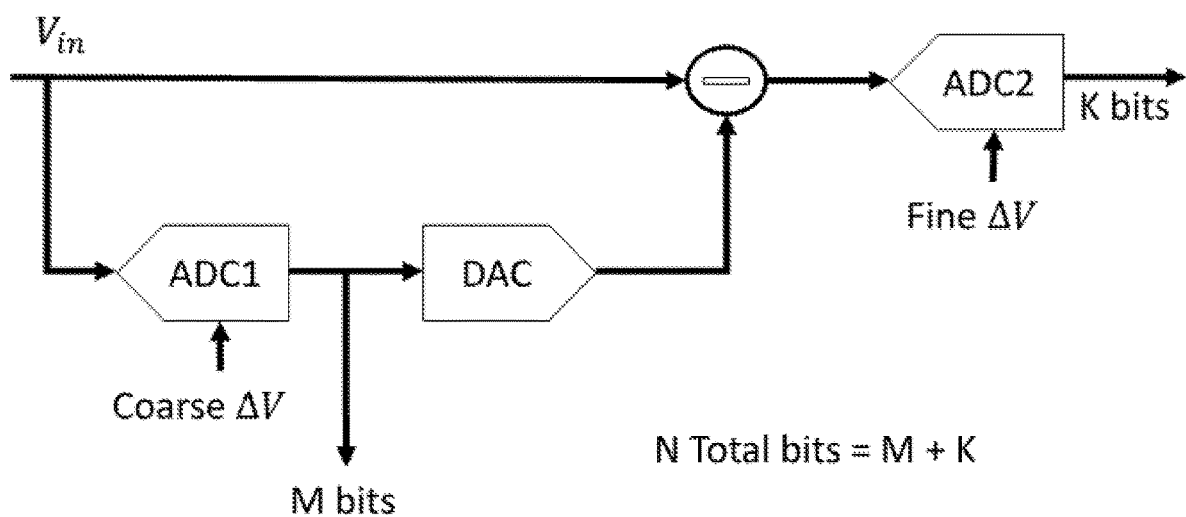
FIG. 2 is a schematic of a circuit in accordance with the present invention.

In accordance with the present invention, and as shown in FIG. 2, the first ADC (ADC1) performs a coarse voltage step on an input signal which is stored digitally in M bits. The M bits is also passed to a digital-to-analog converter (DAC), which converts the M bits back into a DAC-converted analog signal. The new DAC-converted analog signal is then subtracted from the original input signal. The second ADC (ADC2) then converts the output of the subtraction using a finer resolution than ADC1, resulting in K bits (which is also stored). The M bits and the K bits are then appended or concatenated together (i.e., the number of M bits and the number of K bits are summed) to result in a final or total N bits. The total N bits thus is greater than the number of bits provided by either ADC individually, and results in an enhanced resolution of the radar sensor and a digital signal with a finer resolution and/or larger dynamic range than either ADC1 or ADC2 is capable of providing individually. In some examples, ADC1 and ADC2 have the same resolution, while in other examples, ADC1 and ADC2 have different resolutions (e.g., the ADC2 may have a finer resolution than the ADC1). Thus, the ADC1 performs a coarse voltage step which is stored in M bits, passed to analog and subtracted to the input signal. The remaining signal is passed to digital with ADC2 using a finer step.

For example, an analog input signal received from the plurality receivers via the plurality of antennas may be approximately 5.125V. The first ADC may perform a coarse voltage step and converts the signal to the M number of bits (e.g., a digital representation of 5V). The DAC then converts the M number of bits back into a first analog signal (i.e., an analog signal of 5V) and the subtractor then removes the 5V from the original analog input signal of 5.125V, leaving a second analog signal of 0.125V. The second ADC then performs a finer voltage step on the 0.125V second analog signal and converts the second analog signal into the K number of bits (e.g., a digital representation of 0.125V). The results from the first ADC (5V) and the results from the second ADC (0.125V) are then concatenated together to establish the total number of bits, which is a digital representation of 5.125V. This example is for illustration purposes only, and it is understood that the ADCs can establish any total number of bits for any input analog signal.

The total number of bits represent a digital value of the voltage of the input signal, which provides the enhanced resolution at higher numbers or values. Resolution of an ADC indicates the number of discrete (i.e., digital) values the ADC can produce over a range of analog values. Thus, the greater the number of bits, the greater the number of values that the ADC can produce, and the greater the resolution the sensor can achieve. For example, if a sensor uses 8 total bits to digitally represent analog values, there would be 256 digital values available. That is, an ADC with a system voltage of 1V would have a resolution of $1/256$ volts. But if only 4 bits are used to digitally represent analog values, there would only be 16 digital values available, and an ADC with a system voltage of 1V would have a resolution of $1/8$ volts. Thus, increasing the total bits used to digitally represent analog values (via the two ADC approach of the present invention) increases the resolution of the radar sensor (without using a high cost high resolution ADC). The ECU or processor may be operable to process the total number of bits to sense or detect the object that the received radio signals (i.e., the analog input signal) reflected from.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A radar sensing system for a vehicle, said radar sensing system comprising:
   a radar sensor disposed at the vehicle so as to have a field of sensing exterior of the vehicle;
   wherein said radar sensor comprises a plurality of transmitters that transmit radio signals via a plurality of antennas, a plurality of receivers that receive radio signals via the plurality of antennas, and wherein the received radio signals are transmitted radio signals that are reflected from an object present in the field of sensing of the radar sensor;
   wherein said radar sensing system comprises a first analog-to-digital converter (ADC), a second ADC, a digital-to-analog converter (DAC), and a subtractor;
   wherein the first ADC has a dynamic range that is different than a dynamic range of the second ADC;
   wherein the first ADC converts an analog input signal derived from the received radio signals into a first number of bits M;
   wherein the DAC converts the first number of bits M into a first analog signal;
   wherein the subtractor subtracts the first analog signal from the analog input signal to determine a second analog signal;
   wherein the second ADC converts the second analog signal into a second number of bits K;
   wherein the first number of bits M is concatenated to the second number of bits K to establish a total number of bits N that represent a digital value of a voltage of the analog input signal; and
   wherein a processor processes the total number of bits N to detect the object that the received radio signals are reflected from.

2. The radar sensing system of claim 1, wherein a digital signal has a finer resolution than either the first ADC or the second ADC is capable of providing or larger dynamic range than either the first ADC or the second ADC is capable of providing.

3. The radar sensing system of claim 2, wherein the the digital signal has a finer resolution than either the first ADC or the second ADC is capable of providing and larger dynamic range than either the first ADC or the second ADC is capable of providing.

4. The radar sensing system of claim 1, wherein the processor is part of a driving assist system of the vehicle, and wherein the driving assist system controls at least one function of the vehicle responsive to the processor processing the total number of bits N.

5. The radar sensing system of claim 1, wherein the total number of bits N is equal to 14 bits.

6. The radar sensing system of claim 1, wherein the dynamic range of the first ADC is coarser than the dynamic range of the second ADC.

7. The radar sensing system of claim 1, wherein the processor processes the total number of bits N to detect objects present exterior the vehicle at a range of up to 250 meters from the vehicle.

8. The radar sensing system of claim 7, wherein a power dynamic range of a radar cross section of detected objects exceeds 40 dBs.

9. The radar sensing system of claim 1, wherein the first ADC has the same resolution as the second ADC.

10. The radar sensing system of claim 1, wherein the radar sensing system comprises one selected from the group consisting of: a Code radar sensing system and an orthogonal frequency-division multiplexing (OFDM) radar sensing system.

11. The radar sensing system of claim 1, wherein the radar sensor operates at 77 GHz.

12. A radar sensing system for a vehicle, said radar sensing system comprising:
   a radar sensor disposed at the vehicle so as to have a field of sensing exterior of the vehicle;
   wherein said radar sensor comprises a plurality of transmitters that transmit radio signals via a plurality of antennas, a plurality of receivers that receive radio signals via the plurality of antennas, and wherein the received radio signals are transmitted radio signals that are reflected from an object present in the field of sensing of the radar sensor;
   wherein said radar sensing system comprises a first analog-to-digital converter (ADC), a second ADC, a digital-to-analog converter (DAC), and a subtractor;
   wherein a dynamic range of the first ADC is coarser than a dynamic range of the second ADC;
   wherein the first ADC converts an analog input signal derived from the received radio signals into a first number of bits M;
   wherein the DAC converts the first number of bits M into a first analog signal;
   wherein the subtractor subtracts the first analog signal from the analog input signal to determine a second analog signal;
   wherein the second ADC converts the second analog signal into a second number of bits K;
   wherein the first number of bits M is concatenated to the second number of bits K to establish a total number of bits N that represent a digital value of a voltage of the analog input signal;
   wherein a digital signal has a finer resolution than either first ADO or second ADO is capable of providing or larger dynamic range than either the first ADC or the second ADC is capable of providing
   wherein a processor processes the total number of bits N to detect the object that the received radio signals are reflected from.

13. The radar sensing system of claim 12, wherein the digital signal has a liner resolution than either first ADO or second ADC is capable of providing and larger dynamic range than either the first ADC or the second ADC is capable of providing.

14. The radar sensing system of claim 12, wherein the processor is part of a driving assist system of the vehicle, and wherein the driving assist system controls at least one function of the vehicle responsive to the processor processing the total number of bits N.

15. The radar sensing system of claim 12, wherein the total number of bits N is equal to 14 bits.

16. The radar sensing system of claim 12, wherein the first ADC has the same resolution as the second ADC.

17. The radar sensing system of claim 12, wherein the radar sensing system comprises one selected from the group consisting of: a Code radar sensing system and an orthogonal frequency-division multiplexing (OFDM) radar sensing system.

18. A radar sensing system for a vehicle, said radar sensing system comprising:

a radar sensor disposed at the vehicle so as to have a field of sensing exterior of the vehicle;

wherein said radar sensor comprises a plurality of transmitters that transmit radio signals via a plurality of antennas, a plurality of receivers that receive radio signals via the plurality of antennas, and wherein the received radio signals are transmitted radio signals that are reflected from an object present in the field of sensing of the radar sensor;

wherein said radar sensing system comprises a first analog-to-digital converter (ADC), a second ADC, a digital-to-analog converter (DAC), and a subtractor;

wherein a dynamic range of the first ADC is coarser than a dynamic range of the second ADC;

wherein the first ADC converts an analog input signal derived from the received radio signals into a first number of bits M;

wherein the DAC converts the first number of bits M into a first analog signal;

wherein the subtractor subtracts the first analog signal from the analog input signal to determine a second analog signal;

wherein the second ADC converts the second analog signal into a second number of bits K;

wherein the first number of bits M is concatenated to the second number of bits K to establish a total number of bits N that represent a digital value of a voltage of the analog input signal;

wherein the total number of bits N is equal to 14 bits; and wherein a processor processes the total number of bits N to detect the object that the received radio signals are reflected from.

19. The radar sensing system of claim 18, wherein a digital signal has finer resolution than either the first ADC or the second ADC is capable of providing or larger dynamic range than either the first ADC or the second ADC is capable of providing.

20. The radar sensing system of claim 19, wherein the digital signal has finer resolution than either the first ADC or the second ADC is capable of providing and larger dynamic range than either the first ADC or the second ADC is capable of providing.

* * * * *

UNITED STATES PATENT AND TRADEMARK OFFICE
CERTIFICATE OF CORRECTION

PATENT NO. : 11,047,977 B2
APPLICATION NO. : 16/280380
DATED : June 29, 2021
INVENTOR(S) : Sergio Duque Biarge et al.

Page 1 of 1

It is certified that error appears in the above-identified patent and that said Letters Patent is hereby corrected as shown below:

In the Claims

Column 5
Line 49, Claim 3, "wherein the the" should read --wherein the--

Column 6
Line 46, Claim 12, "first ADO or second ADO" should read --first ADC or second ADC--
Line 48, Claim 12, "of providing" should read --of providing; and--
Line 53, Claim 13, "liner resolution than either first ADO" should read --finer resolution than either first ADC--

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*